United States Patent [19]

Combe

[11] 4,407,479

[45] Oct. 4, 1983

[54] PIPE HANGER

[76] Inventor: Hubert Combe, Lankwitzer Str. 39, 1000 Berlin 42, Fed. Rep. of Germany

[21] Appl. No.: 319,544

[22] Filed: Nov. 9, 1981

[30] Foreign Application Priority Data

Nov. 20, 1980 [DE] Fed. Rep. of Germany ....... 3044008

[51] Int. Cl.³ .............................................. F16L 3/00
[52] U.S. Cl. ...................................... 248/59; 248/62; 411/188; 411/389
[58] Field of Search ................. 248/231.6, 316.8, 74.7, 248/230, 59, 58, 62, 72, 67.7; 403/405, 408, 97; 411/188, 389, 161, 162, 164, 163, 160, 187, 332

[56] References Cited

U.S. PATENT DOCUMENTS

| | | | |
|---|---|---|---|
| 2,375,513 | 5/1945 | Bach | 248/59 |
| 2,780,429 | 2/1957 | Vanier | 248/59 |
| 3,077,218 | 2/1963 | Ziegler | 411/161 |
| 3,223,371 | 12/1965 | Miller | 403/97 |
| 3,276,172 | 10/1966 | Alvden | 411/389 |

*Primary Examiner*—William H. Schultz
*Assistant Examiner*—Ramon O. Ramirez

[57] ABSTRACT

A pipe hanger between whose legs a joint member is inserted and held by the force of a bolt. Both a rigid connection of the joint member with the pipe hanger and a slipping connection of the joint member with the pipe hanger is achieved enabled by spiral ridges of teeth which in the case of the rigid connection engage and in the case of the slipping connection glide upon each other.

6 Claims, 20 Drawing Figures

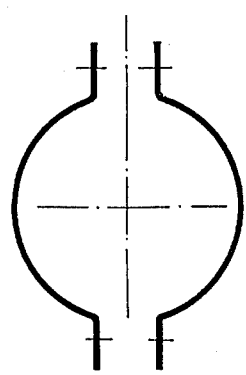 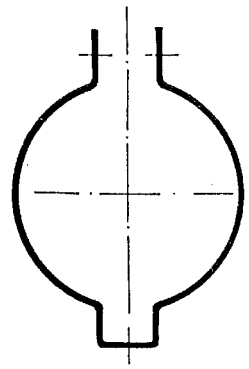 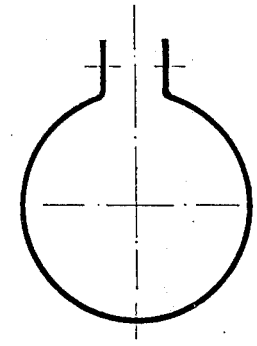
FIG.11a.  FIG.11b.  FIG.11c.
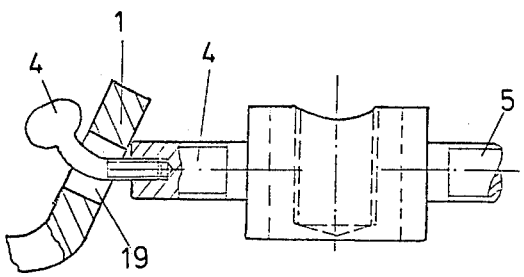
FIG.12a.
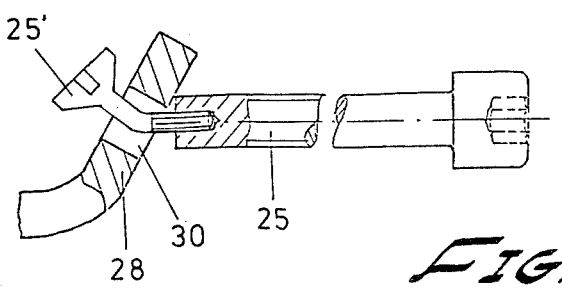
FIG.12b.

PIPE HANGER

TECHNICAL FIELD

The invention relates to pipe hangers and in particular to pipe hangers having two legs connected to a joint part by a rigid or flexible connection.

BACKGROUND ART

In German Patent 29 07 850 Combe discloses a pipe hanger of this type with a joint part either rigidly or flexibly connected with the pipe hanger. However, both the manufacturer and the user experience the following disadvantages with the above hanger:

In the case of the rigid connections a torque develops which will unscrew the joint part from its position between the hanger legs. It is essential that these sections of the hanger legs are sufficiently rigid to absorb the great forces when they occur. These sections are not within the tension area of the hold-down bolt head and the hold-down bolt nut and receive no support from the tension area. Thus, the hanger legs have to be very strong, which increases the production costs of the hanger.

The joint part requires two pairs of contact surfaces for rigid and flexible connections of the joint part with the hanger. For each pair of contact surfaces a drilled through hole is required for the hold-down bolt which holds together the joint part and the hanger legs. In places where these drill holes have been made, in particular at such locations where they intersect, there is no room in the joint part for a further drill hole to hold the mounting part (e.g. threaded rod) perpendicular to the drill holes. For this reason the joint becomes large and expensive.

Furthermore, there is only a single way of setting in the case of the rigid hanger/joint part connection, and only small angular freedom in the case of the flexible connection.

It is the objective of the invention to eliminate these drawbacks by halving the number of contact surfaces required and at the same time increasing the opportunities for force distribution, increasing the range of adjustment of the joint part and reducing the dimensions of the joint part and the hanger legs.

DISCLOSURE OF INVENTION

These problems are solved by providing a joint part having at each end two press-fitted threaded studs that connect by means of nuts to the contact surfaces of the two hanger legs. The contact surfaces of the joint part and the hanger legs have ring-shaped, serrated surfaces that engage in the case of a rigid connection and that glide on each other in the case of a slipping connection. The ring-shaped, serrated surfaces are inside the clamping range of the nuts. In an alternative embodiment, a single bolt runs through the joint part.

Apart from the great advantage of improved force distribution by means of serrated surfaces in the pressure cone of the force exerted by the hold-down bolt, there is a particular advantage of the joint part having only one pair of contact surfaces. In one embodiment there are two drill holes provided for the hold-down bolts, thus allowing room for tapping the joint part (e.g. for a threaded rod). In that case the joint part becomes very small and symmetrical, which apart from saving in material enables cost-saving production on cold forging presses.

The joint part can engage in any position in the case of the rigid connection with the hanger legs and rotate fully about the common center line of the threaded studs in the case of the slippable connection.

If, in the case of the rigid connection, a torque develops which will unscrew the joint part from its position opposite the hanger legs, the force arising acts on the ring-shaped serrated contact surfaces between the joint part and the hanger legs. It is sufficient for stress purposes that these surfaces be of a size that they do not overlap the area of the pressure cone of the threaded studs' nuts and/or the bolt head. No distortion of the hanger legs is possible in this region and therefore the hanger legs need not be reinforced.

In addition, the external dimensions of the hanger legs, in particular the length, may be designed smaller than in the previous hanger type, which has major mounting advantages for the user, and also prevents the hanger legs from projecting beyond the insulation of the pipeline.

With oblique edges, each tooth of the ring-shaped serrated surface converts a part of the torque force in the tension to the bolt and thus increases the surface pressure and with it the frictional force on the oblique serrated surfaces which are clamped to each other. Thus, the force absorbed by the teeth as a result of the contacting surfaces is relieved due to the frictional resistance that arises from all of the loaded, oblique, serrated surfaces.

BRIEF DESCRIPTION OF DRAWINGS

FIGS. 11a, 11b and 11c show various hanger types for which the invention is suitable.

FIG. 12a shows a joint part with two threaded studs with an extension at the end of one of the studs in the form of a bent screw for suspension of a hanger leg by its through hole for assembly purposes.

FIG. 12b shows a hold-down bolt which also has an extension in the form of a bent screw for suspension of a hanger leg for assembly purposes.

BEST MODE FOR CARRYING OUT THE INVENTION

Figure 1:
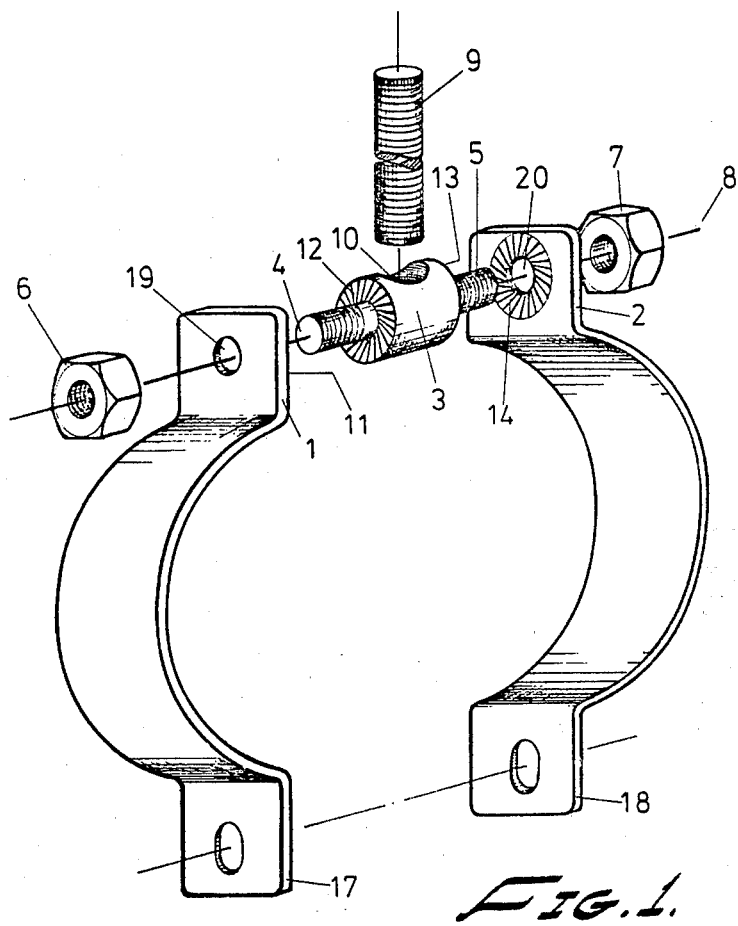
FIG. 1 is an exploded perspective view of the apparatus of the present invention, with joint and mounting part.

The pipe hanger or the pipe hanger halves according to FIG. 1 and FIGS. 11a, 11b, and 11c show at least one pair of legs (1, 2) facing each other. Both of the legs (1, 2) have one hole each, which is surrounded by a ring-shaped serrated surface (11, 14). The pipe hanger or rather the pipe hanger halves are sheet or strip metal parts produced on punch presses, in particular of the steel quality St 52.

Joint part 3 has two pressfitted threaded studs (4, 5), located in center line 8 and provided with hold-down nuts 6, 7. In addition, perpendicular to the threaded stud's center line, the joint part has a bore hole (10) with threads for mounting part 9, which can be a threaded rod. This bore hole (10) provides a safety device against loosening of the threads. Joint part 3 and mounting part 9 may be constructed as one unit. Serrated ring-shaped surfaces (12, 13) are arranged at joint part 3 around the threaded studs 4, 5 and the surfaces of the hanger legs 1, 2 facing joint part 3 are also equipped with serrated circular surfaces (11, 14).

The joint part is made of e.g. CQ 22 material I.1152, according to DIN 1654.

Figure 2:
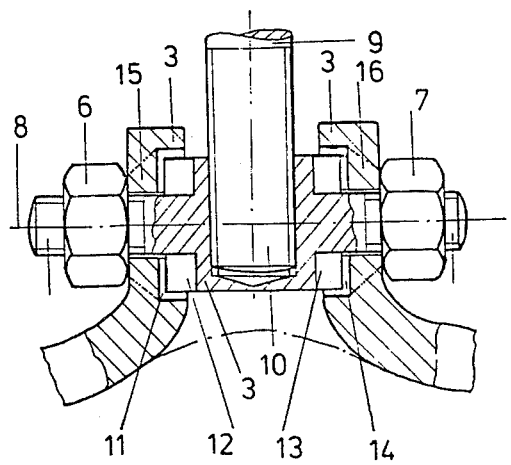
FIG. 2 is a partial cutaway view through the center line of the joint part and the accessory hanger legs, showing, particularly, the position of the pressure cones spreading from the nuts.

Pressure cones 15, 16 (FIG. 2) originate from the hold-down nuts 6, 7, building up in the material of the hanger legs 1, 2 and acting on the ring-shaped serrated surfaces 11, 12, 13, 14.

Figure 3A:
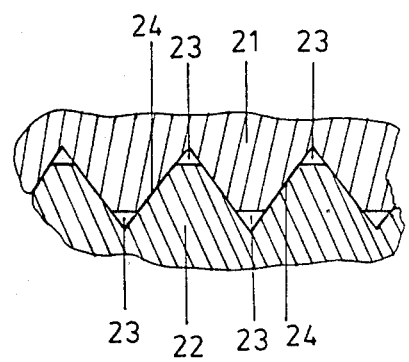
FIGS. 3a and 3b are diagrams of the triangular tooth profile in the exterior region of the ring-shaped tooth system.
Figure 3B:
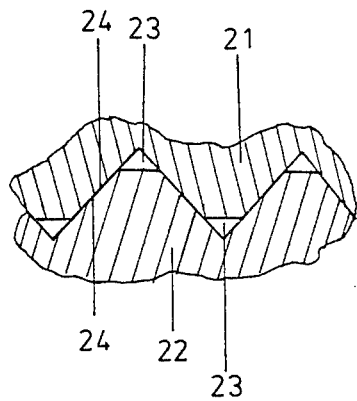
Figure 4A:
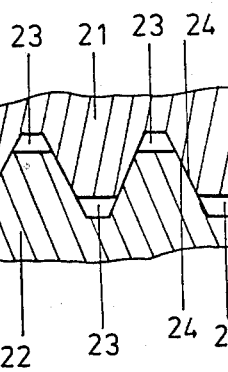
FIGS. 4a and 4b are diagrams of the trapezoidal tooth profiles in the interior and the exterior portion of the ring-shaped tooth system.
Figure 4B:
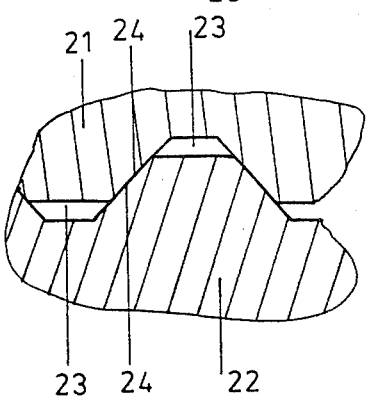

Engaging teeth of two serrated areas (21, 22) illustrate the section in FIGS. 3a and 3b as well as 4a and 4b. A free space (23) remains between the missing tips and troughs of the serrated areas if the tooth tips are cut off, while the beveled surfaces (24) can be tightly pressed against each other. When the serrated areas (21, 22) engage, the dirt which is likely to accumulate under building site conditions can escape into the free space (23) so that in addition to the tooth resistance the total frictional force can act on the beveled surfaces (24).

Everywhere within one ring-shaped serrated surface the individual teeth may be equally high (FIGS. 3a, 3b), even though, for reasons of geometry, the teeth become wider in the outer part of the serrated circular surface (FIG. 3b). The beveled tooth surfaces are then curved surfaces. In this case, stamping of the ring-shaped serrated surfaces 11, 12, 13, 14; 31, 32, 33, 34 is facilitated since with equally high teeth the material need not be irregularly compressed.

Figure 5A:
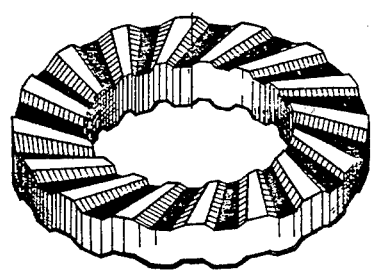
FIGS. 5a and 5b are views of a ring-shaped serrated surface of an intermediate disc with spiral tooth system and trapezoidal right-handed tooth profile or left-handed tooth profile.
Figure 5B:
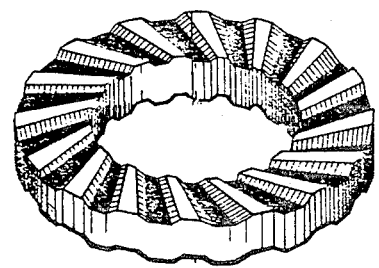

FIGS. 5a and 5b illustrate a ring-shaped serrated surface with spirally arranged teeth of equal height either right-handed or left-handed. In an alternate embodiment an intermediate disc would have spirally arranged teeth on both sides as in FIGS. 5a and 5b.

Figures 6, 7:
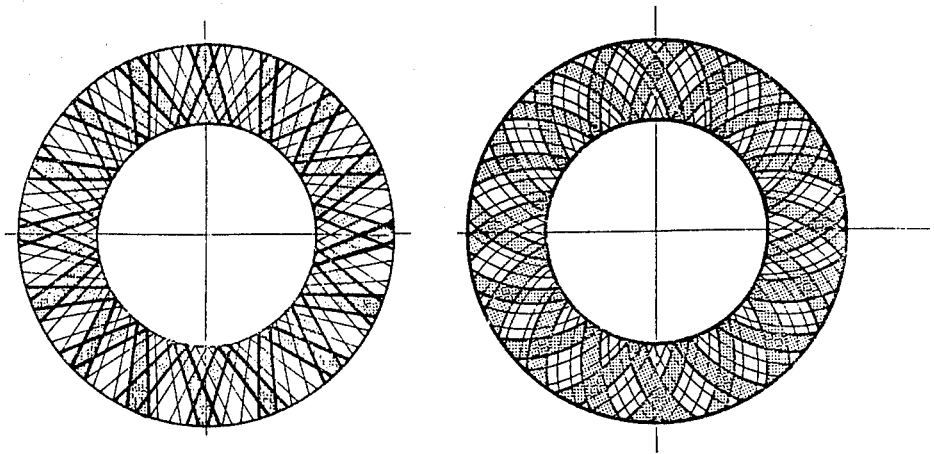
FIG. 6 shows the non-engaging effect in two ring-shaped serrated surfaces placed on each other, both of them provided with identical right-handed spiral tooth systems.
FIG. 7 shows the non-engaging effect in two ring-shaped serrated surfaces placed on each other, their teeth being bent in a circular arc.

FIG. 6 shows the surface of the clipped teeth in a ring-shaped serrated surface with right-handed teeth as well as a second right-handed serrated surface of the same type which has been placed on the first one. As these tooth tip surfaces are all located on one level and continually intersect each other, it is obvious that these teeth have to glide smoothly on each other.

The same applies to radially arranged teeth, with coarse and fine spacing. Clipped teeth as in FIGS. 3a, 3b, 4a, 4b and teeth edges evenly distributed over a span of 400° can be arranged in the ring-shaped serrated surface in such a way that their edges taper to the midpoint or centerline of the circular surface.

If we suppose a coarse spacing with $400° \div (3 \times 8) = 16.66°$ and a fine spacing with $400° \div (4 \times 8) = 12.5°$, it is evident that the coarse serrated surface at joint part 3 can engage in a matching coarse serrated surface located opposite at hanger leg 1 and a fine serrated surface at joint part 3 in a matching fine serrated surface located opposite at hanger leg 2, in fact each individual toothing in so many places as teeth are available per toothing. Both can engage simultaneously in a grating of $400 \div 8 = 50°$ (FIG. 8a).

The difference in the spacing angle between two teeth of the coarse toothing and the division angle between two teeth of the fine toothing amounts, in this example, to $16.66° - 12.5° = 4.16°$.

Figure 8A:
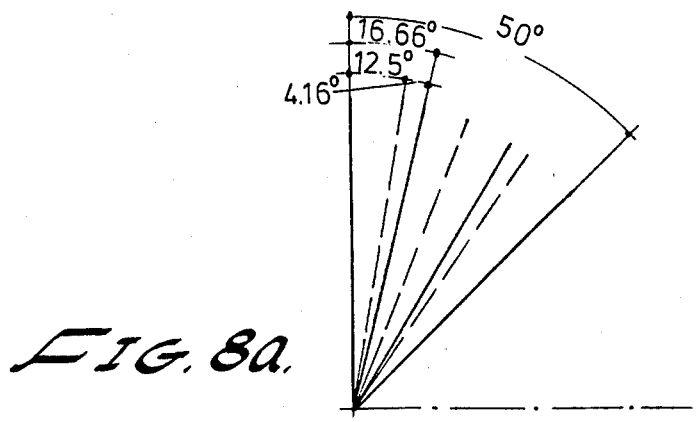
FIGS. 8a and 8b show the non-engaging effect in two ring-shaped serrated surfaces placed on each other, one of them showing a rough and the other a starlike tooth system.
Figure 8B:
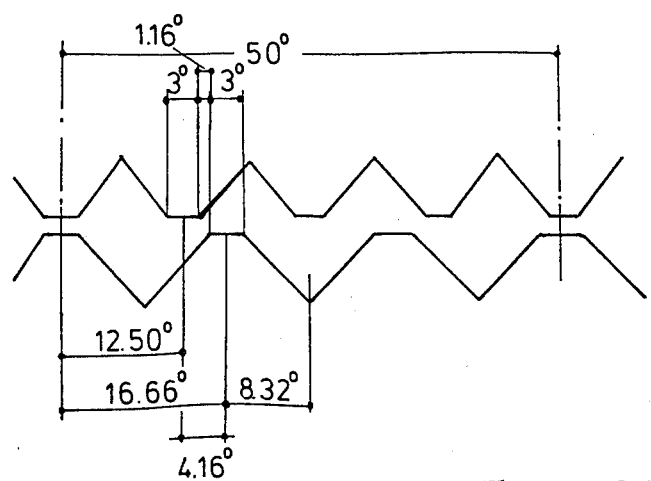

If we suppose further—irrespective of coarse or fine teeth—that the tooth tip cut off from one tooth has a tooth tip angle of 3°, we can first consider the case that the fine toothing lies on the coarse one, in fact, in such a way that the tooth tip surface of every fourth coarse tooth and the tooth tip surface of every fifth fine tooth lie exactly on one another (FIG. 8a, FIG. 8b). Then the tooth tip surfaces of a tooth pair immediately adjacent to an opposite such a congruent pair of tooth surfaces, i.e. of a coarse and a fine tooth, have an angular distance of $4.16° - (2 \times 1.5°) = 1.16°$ to each other.

When rotating the ring-shaped surfaces with coarse and fine teeth placed on each other, against each other about their common center line, the tooth tip surfaces of this adjacent tooth pair are already in contact with each other following a 1.16° turn. However, a total turn of 3° is necessary for the first tooth tip pair to lose contact again.

This example shows that at least eight tooth tip pairs lie on each other, in fact in an angular distance of 50°, which means that the coarse and fine teeth-lying on top of each other—cannot engage but have to glide on each other.

The serrated circular surface 11 of hanger leg 1 and the serrated circular surface 14 of hanger leg 2 as well as the two serrated circular surfaces 12 and 13 of joint part 3 can now be provided with spiral teeth according to FIGS. 5a and 5b, which are mirror images, i.e. the direction of rotation of the spiral teeth is different. If the one direction of rotation is designated with the letter R for the right-handed rotation and the other with the letter L for left-handed rotation, the following designations can be applied to hanger legs 1, 2 and to joint part 3:

|  | hanger leg 1 | joint | part | hanger leg 2 |
|---|---|---|---|---|
| contact surface | 11 | 12 | 13 | 14 |
| direction of rotation | R | L | R | L |

If the structural parts are assembled according to this principle, the rigid connection has been realised. If joint part 3 is rotated about the center line of mounting bolt 9 by 180°, the following designations apply:

| contact surface | 11 | 13 | 12 | 14 |
| direction of rotation | R | R | L | L |

With this arrangement the flexible connection is realised without changing the structural parts.

It goes without saying that the same procedure may analogously be applied to the radial tooth arrangement. If the coarse teeth spacing is designated with the letter G and the fine teeth spacing with the letter F, the following applies:

|  | hanger leg 1 | joint part | | hanger leg 2 |
| --- | --- | --- | --- | --- |
| For the rigid connection |  |  |  |  |
| contact surface | 11 | 12 | 13 | 14 |
| teeth spacing | G | G | F | F |
| For the flexible connection |  |  |  |  |
| contact surface | 11 | 13 | 12 | 14 |
| teeth spacing | G | F | G | F |

There are various ways for the teeth layout of the circular serrated surfaces 11, 12, 13, 14. FIG. 7 is another example, analogous to FIG. 6 and the description thereof. The principle works with other serrations also, e.g. star toothings with coarse and fine spacings.

FIGS. 5a and 5b illustrate intermediate discs. An intermediate disc of that kind may be clamped between joint part 34 and hanger leg 1 and (or) 2, which creates a different hanger diameter. An intermediate disc of this kind in no way impairs the dual function of the hanger with rigid or flexible changeover between pipe hanger legs 1, 2 and joint part 3. Intermediate discs of this kind might prove useful to the pipe fitter in case of minor differences of pipe diameters. This applies in particular to instances when the pipe hanger is made from a single piece according to FIG. 11b or FIG. 11c.

The principle of applying circular serrated contact surfaces may be used in a very simple way to achieve a rigid connection. For this purpose a simple radial toothing is utilized whose teeth point straight to the center of the circular surface. If in one hanger—consisting of two halves—the two hanger legs are exchanged according to FIG. 1 so that the lower leg (17) of the first half of the hanger (1) comes to rest on the circular serrated surface 12 of joint part 3 and leg 18 of the second half of the hanger (2) on the circular serrated surface 13, then the flexible connection is achieved again.

Figure 9:
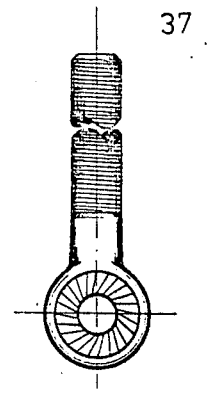
FIG. 9 is a side view of an alternate construction for a joint part with a drill hole to accommodate a hold-down bolt with a solid-molded mounting part threaded externally.
Figure 10A:
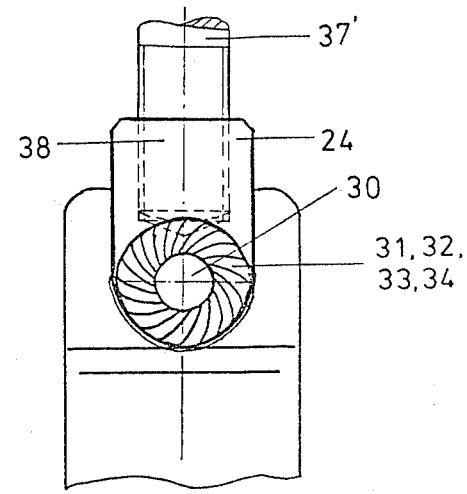
FIGS. 10a and 10b show alternate constructions of a joint part according to FIG. 9, with internal thread for the mounting part.
Figure 10B:
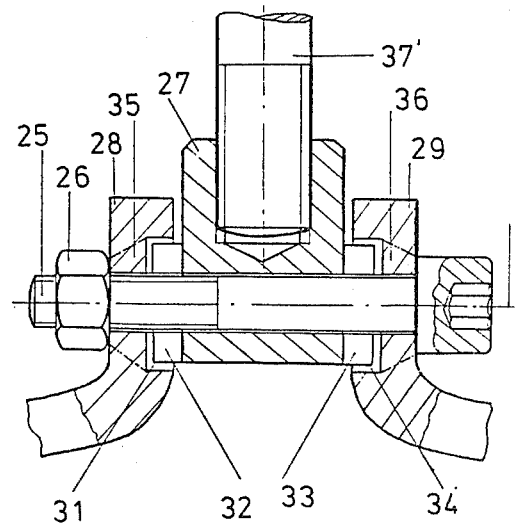

Other joint parts may be used in connection with serrated circular surfaces. Instead of threaded studs 4, 5 mounted onto joint part 3 (FIG. 1) bolt 25 together with head and nut (FIGS. 10a, 10b) are used. Through this solution joint part 3 may be replaced by ordinary eye bolts of DIN 444, equipped with adequate radial toothings (FIG. 9) as well as with eye bolts in which the exterior thread (37) (mounting part) is replaced by an interior thread (38) and a separate mounting part 37'. Modified joints of this kind are illustrated in FIG. 10a and FIG. 10b.

With a hanger according to FIG. 1 and FIG. 11a, consisting of two halves, it is possible to equip the free pair of hanger leg ends (17, 18) with serrated circular surfaces and to add a further mounting part (3) for coupling an additional pipe hanger or for loading the halves on two sides, which may be used with ascending and descending strands of pipelines.

The free hanger leg ends (17, 18) can be provided with an oval-shaped hole, as in FIG. 1, which will facilitate the mounting of pipes when one half of the hanger is already suspended by allowing the quick closing of the second half when the (heavy) pipe is mounted.

The extension 4', 25' of threaded stud 4 and/or stud 5 or of the hold-down bolt of the free hanger leg end (17, 18), which are shown in FIGS. 12a, 12b serve the same purpose. This extension can, e.g., have the form of a bent screw as illustrated in FIG. 12a, 4' and FIG. 12b, 25'. It can either be solidly connected with studs 4, 5 or with the end of the hold-down bolt or by means of a thread. In case of a connection via thread the bent screw can be used for mounting purposes and subsequently be dismantled in order to be used again.

I claim:

1. A pipe hanger comprising,
   a pair of oppositely curve legs, joined at one end and having flat contact areas facing each other at the opposite end, the contact areas having inwardly facing, annular, first serrated surfaces defining holes within each annular surface,
   a cylindrical member having a central region of larger diameter and at least one end region of narrower diameter, the central region terminating on opposite sides in annular second serrated surfaces for engaging the first serrated surfaces of the contact areas, the end region of narrower diameter passing through a hole in an annular surface and having means for clamping the cylindrical member relative to the contact areas.

2. The pipe hanger of claim 1 wherein the first serrated surfaces have teeth running spirally complementary to the second serrated surfaces, thereby forming a locked connection when engaged.

3. The pipe hanger of claim 1 wherein the first serrated surfaces have teeth different in number than the second serrated surfaces for forming a slipping connection when engaged.

4. The pipe hanger of claim 1 wherein the cylindrical member comprises a pair of narrow diameter threaded studs at end regions thereof, the studs coaxially extending into a larger diameter member in the central region.

5. The pipe hanger of claim 1 wherein at least some of said serrated surfaces have teeth with truncated upper surfaces forming a free space upon engagement with opposed serrated surfaces, thereby providing for accumulation of foreign matter.

6. A pipe hanger comprising,
   a pair of oppositely curved legs, the ends of said curved legs having flat contact areas facing each other, the contact areas having inwardly facing, annular, first serrated surfaces defining holes within each annular surface and,
   a pair of cylindrical members joining said legs at both ends, each cylindrical member having a central region of larger diameter and at least one end region of narrow diameter, the central region terminating an opposite sides in annular second serrated surfaces for engaging the first serrated surfaces of the contact areas, the end region of narrower diameter passing through a hole in an annular surface and having means for clamping the cylindrical member relative to the contact areas.

* * * * *